(No Model.)
K. E. MANN.
SLOP PAIL.
No. 468,571. Patented Feb. 9, 1892.
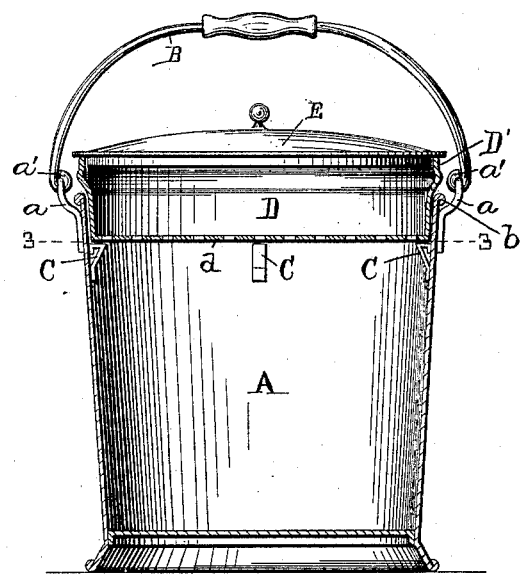
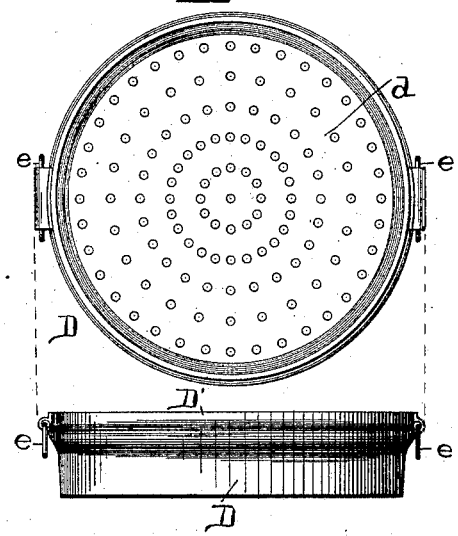
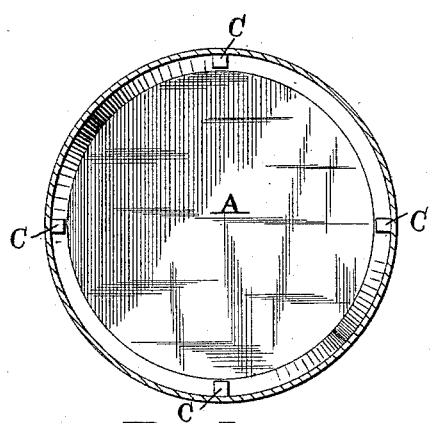
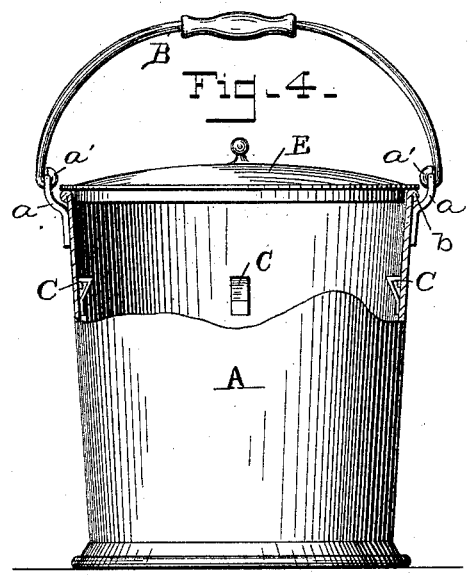
Witnesses:
Otto H. Ehlers.
Frank P. Davis.
Inventor:
Kate E. Mann
By Chas. B. Mann.
Attorney.
THE NORRIS PETERS CO., PHOTO-LITHO., WASHINGTON, D. C.

UNITED STATES PATENT OFFICE.

KATE E. MANN, OF BALTIMORE, MARYLAND.

SLOP-PAIL.

SPECIFICATION forming part of Letters Patent No. 468,571, dated February 9, 1892.

Application filed September 29, 1891. Serial No. 407,146. (No model.)

*To all whom it may concern:*

Be it known that I, KATE E. MANN, a citizen of the United States, residing at Baltimore city, in the State of Maryland, have invented certain new and useful Improvements in Slop-Pails, of which the following is a specification.

This invention relates to an improvement in slop-pails.

Considerable annoyance is experienced by house-keepers from the variety of matter—such as lint, rags, burned matches, fruit-peelings, &c.—which finds its way into the slop-pail.

The object of my invention is to overcome this trouble by constructing the pail to receive a strainer in its top portion, which strainer will catch such objectionable matter and retain it.

To this end the invention may be said to consist in the novel features of construction and combinations of parts which will be described hereinafter.

The invention is illustrated in the accompanying drawings, in which—

Figure 1 represents a vertical section of the pail with strainer and lid on; Fig. 2, a top and side view of the strainer; Fig. 3, a section of the pail on the line 3 3 of Fig. 1; and Fig. 4 a side view, partly in section, of the pail with the lid on and the strainer removed.

The letter A designates the pail, which has tapered sides and suitable ears $a$ secured to its opposite sides and projecting above the upper rim $b$ of the pail to receive the hooked ends $a'$ of the bail B. At a suitable distance below the upper rim of the pail a number of lugs C are secured to and project from the inside of the pail. In the present instance there are four of these lugs, and they comprise a rest or support, as will appear hereinafter.

The strainer D is in the form of a shallow pan having a perforated bottom $d$, and is supported by the lugs C, its bottom $d$ resting on said lugs. The strainer-sides project above those of the pail, and this upwardly-projecting portion has attached to its exterior on opposite sides suitable pivoted handles $e$, by which the strainer may be lifted out when desired. The upper portion D' of the strainer is flared or enlarged somewhat to receive a lid or cover E, which also fits the pail A, as illustrated in Fig. 4. Slops deposited in the pan D strain through the perforated bottom $d$ into the pail, and the foreign matter, of a nature hereinbefore referred to, is retained in the pan D. Now when the slops are to be thrown out the strainer is lifted out by the handles $e$ and the liquid matter in the pail may be emptied into the drain-pipe without danger of stopping up the latter and without the trouble of removing objectionable matter.

My arrangement is useful for both kitchen and chamber slops.

Having thus described my invention, what I claim as new, and desire to secure by Letters Patent, is—

The combination of the pail having rest-lugs projecting from its interior surface below the upper rim and a strainer comprising a pan fitting in said pail and having a perforated bottom resting on said lugs, the strainer sides projecting above those of the pail and provided with suitable handles.

In testimony whereof I affix my signature in the presence of two witnesses.

KATE E. MANN.

Witnesses:
 JNO. T. MADDOX,
 FRANK P. DAVIS.